United States Patent [19]

Ishikawa

[11] Patent Number: 5,343,400
[45] Date of Patent: Aug. 30, 1994

[54] METHOD FOR DETECTING RELATIVE TRAVEL DIRECTION OF A VEHICLE

[75] Inventor: Masataka Ishikawa, Higashimatsuyama, Japan

[73] Assignee: Zexel Corporation, Saitama, Japan

[21] Appl. No.: 863,282

[22] PCT Filed: Sep. 2, 1991

[86] PCT No.: PCT/JP91/01175

§ 371 Date: Jun. 24, 1992

§ 102(e) Date: Jun. 24, 1992

[30] Foreign Application Priority Data

Sep. 4, 1990 [JP] Japan ................. 2-234236

[51] Int. Cl.$^5$ .......................................... G06F 15/50
[52] U.S. Cl. ............................ 364/450; 364/449; 364/565; 364/571.01
[58] Field of Search ............... 364/449, 450, 571.01, 364/565; 340/988

[56] References Cited

U.S. PATENT DOCUMENTS

| Re. 33,025 | 8/1989 | Matsumoto et al. ......... 364/444 |
| 4,055,750 | 10/1977 | Jellinek .................... 364/424 |
| 4,633,407 | 12/1986 | Freinstein et al. .......... 364/450 |
| 4,788,645 | 11/1988 | Zavoli et al. .............. 364/449 |
| 5,058,023 | 10/1991 | Kozikaro .................. 364/450 |
| 5,179,526 | 1/1993 | Zimmer et al. ............. 364/565 |

FOREIGN PATENT DOCUMENTS

| 62-240881 | 10/1987 | Japan . |
| 64-88311 | 4/1989 | Japan . |
| 1-304312 | 12/1989 | Japan . |
| 2129515 | 5/1990 | Japan . |

Primary Examiner—Thomas G. Black
Assistant Examiner—Julie D. Day
Attorney, Agent, or Firm—Pollock, Vande Sande & Priddy

[57] ABSTRACT

Travel locus vectors of a vehicle are calculated at prescribed time intervals on the basis of data related to the rotational angle of a pair of wheels of the vehicle. The relative travel direction of the vehicle is detected on the basis of the travel locus vectors. The prescribed time intervals are changed in response to at least one traveling condition of the vehicle selected from its traveling speed and its turning angle.

8 Claims, 2 Drawing Sheets

ND FOR DETECTING RELATIVE TRAVEL DIRECTION OF A VEHICLE

DESCRIPTION

1. Technical Field

The present invention relates to a relative direction detecting method for detecting the relative travel direction of a vehicle.

2. Background Art

In recent years, various vehicular navigation systems capable of informing the driver of the current location of the vehicle have been developed. One known navigation system of this type detects the distance traveled and the relative travel direction of the vehicle at fixed time intervals, successively calculates the vector sum of these detection results, and displays the current location of the vehicle by means of an appropriate display device on the basis of the calculated result and the given initial vehicle location information.

Japanese Patent Application Public Disclosure No. Hei 1-304312 discloses a navigation system of this type in which the difference between the number of revolutions of left and right wheels occurring when a vehicle changes its travel direction is detected by means of a pair of sensors for detecting the rotational speed of the wheels, and then the travel locus vector of the vehicle is obtained at fixed time intervals on the basis of the difference, whereby the relative travel direction of the vehicle is calculated by calculating the sum of the resulting vectors.

However, if the time interval is set relatively long in the case where calculation of the travel locus vectors of the vehicle is carried out at fixed time intervals, the distance per vector becomes long so that there is a possibility that gentle curves during the interval will not be detected when the vehicle is traveling fast.

On the contrary, if the time interval is set relatively short, although the minor changes in the travel locus vectors will be shown accurately, unnecessary calculations will be carried out during, for example, travel of the vehicle in a straight line. As a result, the load on the computer system becomes unnecessarily large, so that it becomes necessary to install a calculation system with unnecessarily large processing capacity.

SUMMARY OF THE INVENTION

It is, therefore, an object of the present invention to provide an improved method for detecting the relative travel direction of a vehicle which is capable of efficiently calculating the travel locus vectors of the vehicle. Disclosure of the Invention The present invention relates to a method for detecting the relative travel direction of a vehicle on the basis of the travel locus vectors of the vehicle calculated on the basis of data indicating the rotational angle of a pair of wheels and is characterized in that the aforesaid time interval is changed in accordance with the traveling speed and turning angle of the vehicle.

The time intervals for calculating the travel locus vectors are made shorter when the vehicle speed is fast or when the turning angle of the vehicle is large, whereby the travel locus vectors are calculated at suitable time intervals for the current traveling condition of the vehicle.

BEST MODE FOR CARRYING OUT THE INVENTION

Figure 1:
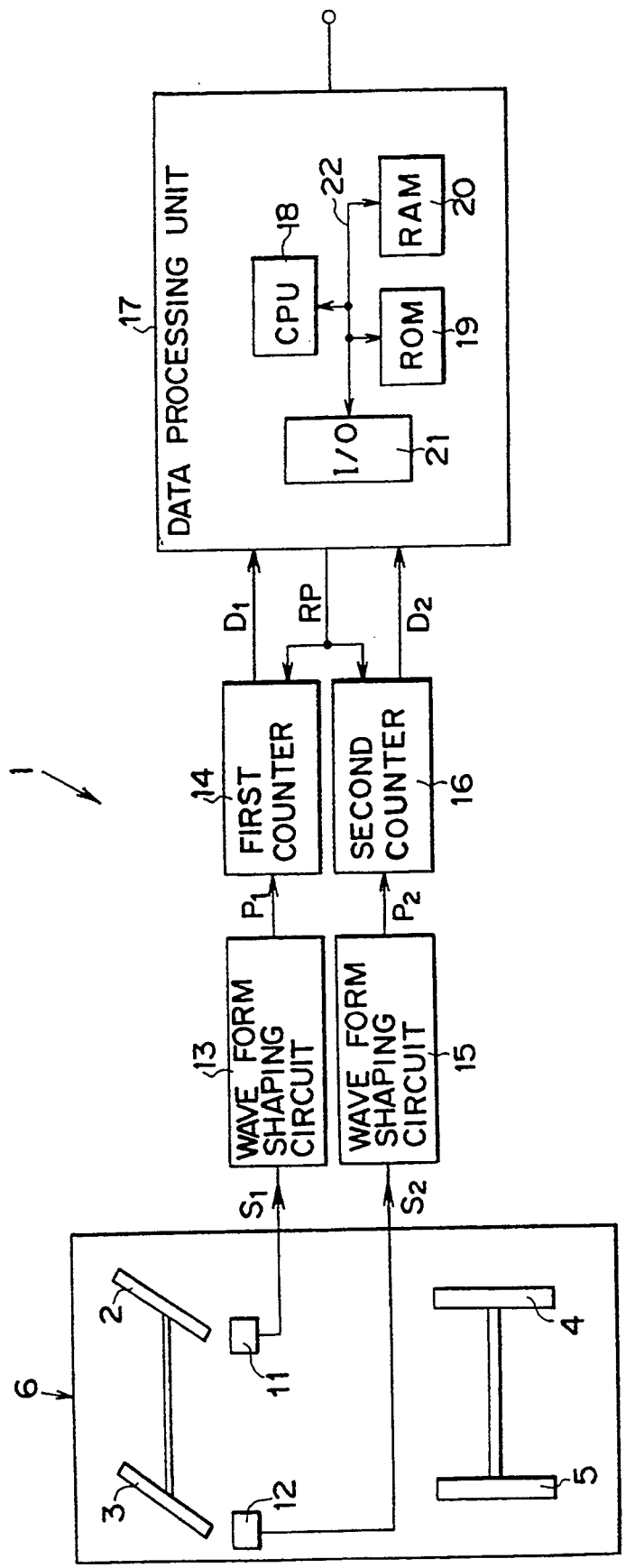
FIG. 1 is a block diagram showing an embodiment of the vehicular relative travel direction detecting system according to the present invention.

FIG. 1 illustrates an embodiment of a detecting system for detecting the relative travel direction of a vehicle according to the present invention. The relative travel direction detecting system 1 is for detecting the relative travel direction of a vehicle 6 which has a right-front wheel 2, a left-front wheel 3, a right-rear wheel 4, and a left-rear wheel 5. The detecting system 1 has a first sensor 11 for producing a first detection signal $S_1$ with a period corresponding to the rotational speed of the right-front wheel 2 and a second sensor 12 for producing a second detection signal $S_2$ with a period corresponding to the rotational speed of the left-front wheel 3.

The first and second sensors 11 and 12 are speed sensors of well-known design, and the wave form of the first detection signal $S_1$ is shaped by a wave form shaping circuit 13 associated therewith, to obtain a pulse train signal $P_1$ which is supplied as counting pulses to a first counter 14. On the other hand, the wave form of the second detection signal $S_2$ is shaped by a wave form shaping circuit 15 associated therewith, to obtain a pulse train signal $P_2$ which is supplied as counting pulses to a second counter 16.

Each of the first and second counters 14 and 16 receives a reset pulse RP generated by a data processing unit 17, as will be described later, and both the first and second counters 14 and 16 are arranged to be reset in response to receipt of the reset pulse RP. A first count data $D_1$ representing the count A of the first counter 14 and a second count data $D_2$ representing the count B of the second counter 16 are supplied to the data processing unit 17.

The data processing unit 17 has a microcomputer system of well-known design having a central processing unit (CPU) 18, a read only memory (ROM) 19, a random access memory (RAM) 20, an input/output unit (I/O) 21, and bus 22 which interconnects these members.

After being supplied to the data processing unit 17, the first and the second count data $D_1$ and $D_2$ are processed in accordance with a data processing program stored in advance in the ROM 19 of the data processing unit 17, whereby the relative travel direction of the vehicle is determined.

Figure 2:
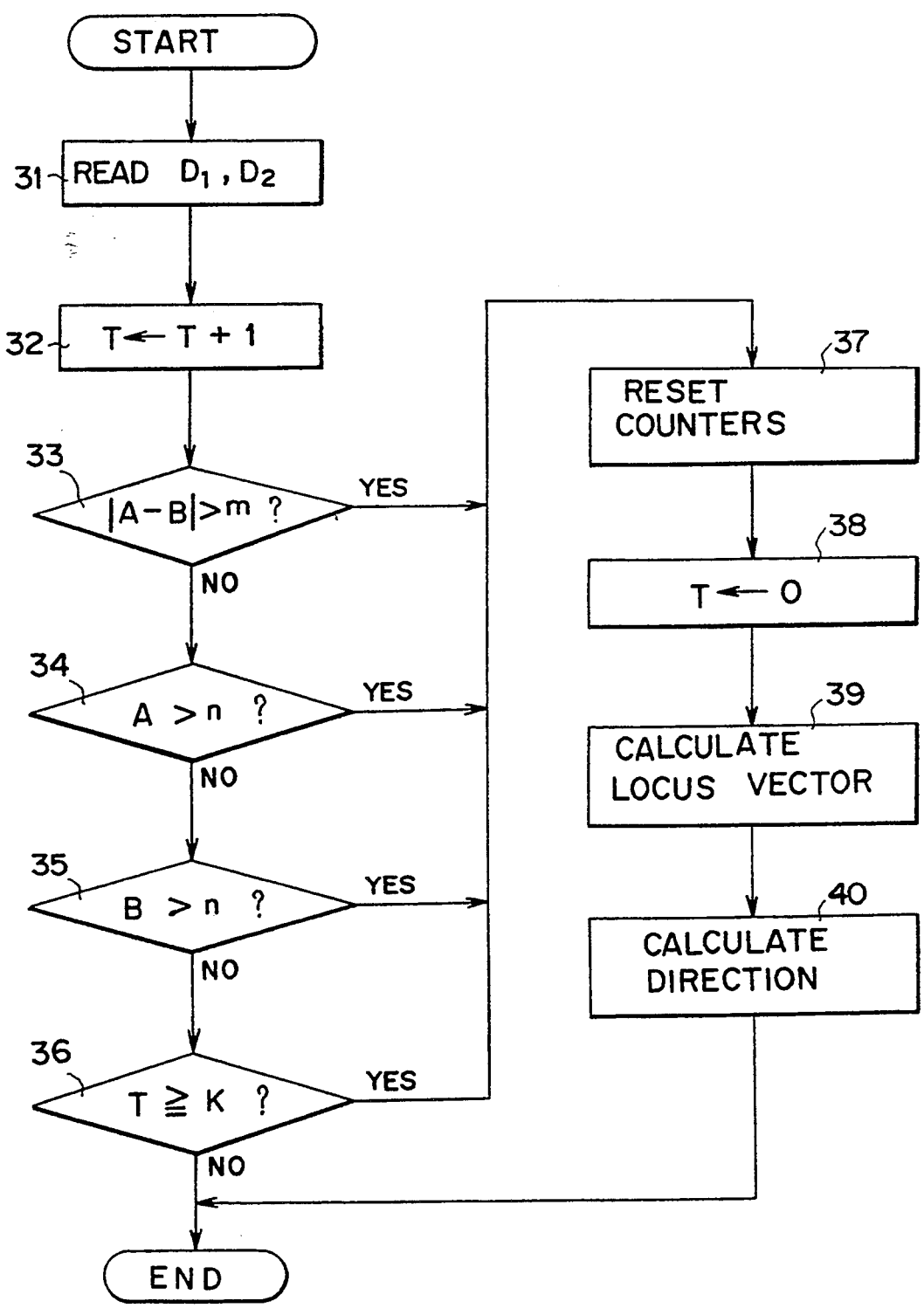
FIG. 2 is a flowchart showing a data processing program which is carried out in the data processing unit of FIG. 1.

FIG. 2 is a flowchart showing the data processing program stored in the ROM 19 of FIG. 1. The data processing procedure will now be described with reference to the flowchart of FIG. 2. This data processing program is activated and executed at prescribed regular time intervals.

After the program has started and the initialization been completed, the data $D_1$ and $D_2$ are read in in step 31 and the counts A and B at that time are stored in the RAM 20. The operation then moves to step 32, wherein the value of a timer T is increased by one.

In the next step 33, it is discriminated whether or not the absolute value of A minus B is greater than a corresponds to the magnitude of the turning angle of the vehicle at that time, and when it is found that the absolute value of A minus B is smaller than m, the operation moves to step 34, wherein it is discriminated whether or not the count A is greater than a prescribed value n. The count A indicates the travel distance measured on the basis of the revolution of the right-front wheel 2 after the first counter 14 was reset, as will be described later. Accordingly, it is discriminated in step 34 whether or not the travel distance measured on the basis of the revolution of the right-front wheel 2 is greater than a prescribed value. When it is found that A is smaller than or equal to n, the operation moves to step 35, wherein it is discriminated whether or not the count B exceeds the prescribed value n. The count B indicates the travel distance measured on the basis of the revolution of the left-front wheel 3 after the second counter 16 is reset in a way that will be described later, and it is discriminated in step 25 whether or not the travel distance indicated by the count B exceeds the prescribed value.

When it is found in step 35 that B is smaller than or equal to n, the operation moves to step 36, wherein it is discriminated whether or not the value of the timer T has reached a prescribed value K. The timer T measures time by increasing its value by one every time the program is executed. When it is found that T is smaller than K, the execution of the program is terminated. When it is found that T is greater than or equal to K, the operation moves to step 37, wherein the reset pulse RP is generated to reset the first and second counters 14 and 16 (see FIG. 1), whereby the counters 14 and 16 are reset.

The value of the timer T is then returned to zero in step 38, and the operation moves to step 39, wherein the locus vector of the vehicle 6 is calculated. The locus vector obtained by this calculation corresponds to the turning angle of the vehicle between the time when the first and second counters 14 and 16 were reset in preceding program cycle and the time when they were reset in the current program cycle.

In the next step 40, the current relative travel direction of the vehicle is calculated by adding the locus vector obtained in step 39 to the locus vector obtained up to step 39, whereby the relative direction is determined and the execution of the program is terminated.

Specifically, when the vehicle is running at a speed lower than that defined by the prescribed value n and the turning angle is smaller than the value defined by the prescribed value m, step 39 is carried out at regular time intervals determined by the period during which the timer T increases from zero to K, and the relative travel direction is detected on the basis of the turning angle calculated at fixed time intervals.

However, when the turning angle becomes larger than the value defined by the value m, or when the vehicle speed becomes faster than that defined by the value n even though the turning angle is small, the result of the discrimination becomes YES in steps 33, 34 or 35 even before the prescribed time has passed after the first and second counters 14 and 16 were reset, so that steps 37 to 40 are carried out without carrying out the discrimination in step 36. That is, the calculation of the locus vectors is carried out when the discrimination in one of steps 33 to 35 is YES, whereby the relative travel direction is detected.

According to this arrangement, the calculation of the locus vector is constantly carried out at necessary and sufficient time intervals because the prescribed time interval is changed if necessary in accordance with the speed and turning angle of the vehicle. Accordingly, the locus vector of the vehicle can be obtained accurately and the relative travel direction can be detected more precisely without unnecessarily overloading the data processing unit 17.

Industrial Applicability

As will be understood form the description above, the method for detecting relative travel direction according to the present invention is suitable for detecting direction in vehicular navigation systems.

What is claimed is:

1. A method for detecting the relative travel direction of a vehicle, said method comprising:
   a calculating step for calculating travel locus vectors of the vehicle on the basis of data related to the rotational angle of a pair of wheels of the vehicle, said calculation step being carried out at time intervals having a prescribed value for a predetermined range of values of at least one traveling condition of the vehicle selected from its traveling speed and its turning angle;
   a detecting step for detecting said traveling condition of the vehicle; and,
   a setting step for changing said prescribed value of the time intervals in response to a value of said traveling condition of the vehicle outside of said predetermined range of values.

2. A method as claimed in claim 1, wherein said setting step changes said prescribed value of the time intervals in response to either one of a traveling speed outside of a predetermined range of speeds and a turning angle outside of a predetermined range of angles.

3. A method as claimed in claim 2, wherein the rotational speeds of the pair of wheels are detected by first and second rotational speed sensors and data relating to said rotational angle is obtained from the output of these sensors.

4. A method as claimed in claim 3, wherein said setting step is arranged to set the calculation time interval shorter than a prescribed value when the value of the difference between the output of the first and second rotational speed sensors becomes larger than a prescribed value.

5. A method as claimed in claim 3, wherein said setting step is arranged to set the calculation time interval shorter than a prescribed value in response to a value of rotational speed indicated by an output from either one of the first rotational speed sensor and the second rotational speed sensor being larger than a prescribed value.

6. A method as claimed in claim 3, wherein said detecting step determines the traveling speed on the basis of the output of the first rotational speed sensor.

7. A method as claimed in claim 3, wherein said detecting step determines the traveling speed on the basis of the output of the second rotational speed sensor.

8. A method as claimed in claim 1, wherein said setting step is arranged to set the calculation time interval shorter than a prescribed value in response to the value of the rotational speed indicated by an output of at least one rotational speed sensor being larger than a prescribed value.

* * * * *